United States Patent
Northway (10) Patent No.: US 8,433,994 B2
(45) Date of Patent: Apr. 30, 2013

(54) INSTRUCTION SET TO INSTANTIATE AN EFFECT ON A TIME CONTAINER

(75) Inventor: Craig William Northway, Gladesville (AU)

(73) Assignee: Canon Kabushiki Kaisha, Tokyo (JP)

( * ) Notice: Subject to any disclaimer, the term of this patent is extended or adjusted under 35 U.S.C. 154(b) by 1126 days.

(21) Appl. No.: 11/996,516

(22) PCT Filed: Oct. 18, 2006

(86) PCT No.: PCT/AU2006/001546
§ 371 (c)(1),
(2), (4) Date: Apr. 3, 2008

(87) PCT Pub. No.: WO2007/045032
PCT Pub. Date: Apr. 26, 2007

(65) Prior Publication Data
US 2008/0204446 A1    Aug. 28, 2008

(30) Foreign Application Priority Data
Oct. 21, 2005 (AU) .................. 2005225104

(51) Int. Cl.
*G06F 9/30* (2006.01)
*G06F 3/14* (2006.01)
(52) U.S. Cl.
USPC .......................... 715/203; 345/481
(58) Field of Classification Search .............. 715/202, 715/203, 205, 207, 723, 726
See application file for complete search history.

(56) References Cited

U.S. PATENT DOCUMENTS
2004/0199866 A1    10/2004 Deshpande .................. 715/202

OTHER PUBLICATIONS

Synchronized Multimedia Integration Language (SMIL 2.0) W3C Recommendation Aug. 7, 2001 (available as of 2005 at http://www.w3.org/TR/2001/REC-smil20-20010807/cover.html#minitoc).*
Scalable Vector Graphics (SVG) 1.2 W3C Working Draft Oct. 27, 2004 (available as of 2004 at http://www.w3.org/TR/2004/WD-SVG12-20041027/).*

* cited by examiner

*Primary Examiner* — William Bashore
*Assistant Examiner* — Nathan Shrewsbury
(74) *Attorney, Agent, or Firm* — Fitzpatrick, Cella, Harper & Scinto (57) ABSTRACT

A method (800) is disclosed of producing an instruction set for rendering on a graphic display (114). The instruction set includes a plurality of time containers (502, 503, 504) to be rendered, with each time container (502, 503, 504) containing at least one timed element to be displayed on the display (114). However, the instruction set must obey a rule forbidding a time container (502, 503, 504) from referencing the content of a different time container (502, 503, 504). The method (800) starts by adding (802) an attribute (505, 506, 507, 508) to a particular time container (502, 503, 504), the attribute (505, 506, 507, 508) being associated with an event, the event being associated with a target element contained within the particular time container (502, 503, 504). Correspondence between the event and an effect on the display of a further time container (502, 503, 504) is then provided (803), in a manner consistent with the rule.

10 Claims, 8 Drawing Sheets

INSTRUCTION SET TO INSTANTIATE AN EFFECT ON A TIME CONTAINER

FIELD OF THE INVENTION

The present invention relates generally to instantiating an effect on the display of time containers and, in particular, to instantiating an effect on a particular time container from a different time container.

BACKGROUND

The Synchronised Multimedia Language (SMIL) provides declarative mark-up instructions for specifying the temporal behaviour of a mark-up document. SMIL defines both the mark-up and semantics necessary to specify the timing of animations and multi-media content in such a mark-up document. SMIL also describes the timing model.

SMIL was designed for integrating into other mark-up languages such as Scalable Vector Graphics (SVG) and Extensible Hypertext Mark-up Language (XHTML). Those other mark-up languages are able to re-use the SMIL mark-up and semantics to provide multi-media and animation functionality within those languages.

SMIL provides timed elements, which are elements that have semantics associated with their temporal states. Examples of timed elements include animations, time containers and multimedia elements.

SMIL therefore provides the concept of a time container. Time containers are a special case of timed elements that group timed elements together in a temporal relationship. SMIL provides for 3 different time containers, namely:

'Par', a parallel time container where all child timed elements run in parallel, i.e. all at the same time.

'Seq', a sequential time container where all child timed elements run sequentially, i.e. one after the other in document order. More specifically the implicit begin time of a child timed element is the end of the previous timed element. Also, the implicit begin time of the first child timed element, is the begin time of the parent time container.

'Excl', an exclusive time container where all child timed elements run exclusively, i.e. only one child can be running at any time.

Appendix A shows an example of the SMIL syntax. This example shows a set of SMIL time containers. Six instances of 'timed content' are shown within the time containers. Under this example, timed content 1 would be played first, followed by simultaneous playing of timed content 2 and timed content 3. After the conclusion of both timed content 2 and timed content 3, timed content 4 would be played, followed by timed content 5 and finally timed content 6.

SMIL further defines attributes that may be used to specify the temporal behaviour of timed elements. These include the synchronisation of the timed elements, repeating conditions and begin and end conditions.

The 'begin' attribute specifies a condition such as a time or event that causes a timed element to begin playing. The valid begin times for timed elements also depend on the relationship between the timed element and the containing parent) time container and other timed elements within the containing time container, commonly referred to as sibling timed elements. Similarly, the 'end' attribute specifies a condition that causes a timed element to end.

From the description above it can be seen that the timing of any timed element (i.e. when it is played) within an SMIL presentation, or another language that re-uses the SMIL language and/or semantics, is dependent on the timing attributes and the relationship of the timed element to other time containers and timed elements.

The 'begin' and 'end' attributes may be specified as lists. These lists may include specification of clock times, relative times, event occurrences and other possible conditions. Event occurrence conditions are particularly useful for controlling transitions between time containers. Using event occurrences as conditions allows the clicking of a button (clicking the graphical representation of an element), or a similar action, to trigger the beginning or ending of a time container. An event occurrence is specified by the event (eg. a pointer click) and the "target element", defined in SVG as the topmost graphics element whose relevant graphical content is under the pointer at the time of the event.

Printing languages typically specify a scoping restriction on the content in each page. Content designated for a particular page may make references to a global dictionary of resources, such as graphics, fill properties or fonts. Content for a particular page cannot reference content defined within the bounds of another page construct.

The scoping restriction applied to printing languages allows a job to be processed using a reduced amount of memory. The reduced memory results from the fact that the contents of each page do not need to be stored after the page has been rendered, allowing a more efficient print renderer implementation.

SVG 1.2 includes syntax for providing pagination. This syntax specifies that a 'pageSet' element indicates the start of paginated content. Any graphical content prior to the 'pageSet' element is rendered on every page. Global resources for the document should also be defined prior to the 'pageSet' element.

A 'pageSet' element may include any number of 'page' elements. A 'pageSet' element may only have children 'page' elements. Further, there may be no direct descendents (i.e. children) of a 'pageSet' element other than 'page' elements.

A 'page' element includes the graphical content that is to be rendered only on that particular page. Children of a 'page' element can only reference global resources or graphics defined prior to the 'pageSet' element or content within the current 'page' element. A 'page' element and its contents are prohibited from referencing content within other 'page' elements.

An example of the structure of SVG content for paginated display or printing is shown in Appendix B. This example shows where global resources or graphics, and the content of each page, should be placed.

A graphical language, such as SVG, may reuse the page functionality to provide a way of instantiating a SMIL presentation. This is particularly useful for providing a document that is suitable for slides displayed on a screen in a meeting/presentation and which can also be printed. SVG 1.2 does this by defining the 'pageSet' element's timing behaviour as analogous to the SMIL 'seq' time container and the 'page' element's time behaviour as analogous to that of the SMIL 'par' behaviour. Any timed elements such as animations within the content of a page will typically be ignored by a printing renderer.

The scoping restriction as applied by SVG 1.2 means that the 'begin' and 'end' attributes of a 'page' element may only specify event based conditions for events whose target elements are within that 'page' element. This prohibits a 'page' element from specifying a 'begin' attribute referencing an event whose target element is within a prior or later 'page' element. The scoping restriction therefore makes it impossible to provide declarative 'page back' functionality in SVG that may be included in slide presentations for slide navigation.

Relaxing the scoping rules for these particular attributes introduces unwanted inconsistency into the SVG instruction set. Implementations of an instruction set parser cannot be optimised for significantly improved efficiency in interpreting an instruction set if that instruction set is not consistent with regards to the scoping rules. Globally relaxing the scoping rules, thereby introducing unnecessary dependencies between pages, would greatly reduce the efficiency of print implementations.

A further alternative that may be adopted to provide page navigation is to make use of scripting. A script with global scope could be defined that uses, for example, the 'beginElement' method to start the appropriate pages on the occurrence of relevant events. Such a script would have to know the identifier of each 'page' element and the order of the 'page' elements, and then keep track of the currently displaying 'page' elements. The script would also have to be tailored to each particular document. It is therefore difficult, if not impossible, to create a template presentation that uses a script to provide page navigation. Moreover, a scripting engine is a large overhead for a User Agent.

SUMMARY

It is an object of the present invention to substantially overcome, or at least ameliorate, one or more disadvantages of existing arrangements.

According to an aspect of the present invention there is provided a method of producing an instruction set for rendering on a graphic display, said instruction set comprising a plurality of time containers to be rendered, each said time container containing at least one timed element to be displayed on said display, wherein said instruction set must obey a rule forbidding a time container from referencing the content of a different time container, said method comprising the steps of:
  adding an attribute to a particular time container, said attribute being associated with an event, said event being associated with a target element contained within said particular time container, and
  providing a correspondence between said event and an effect on the display of another one of said time containers, in a manner consistent with said rule.

According to another aspect of the present invention, there is provided a method of displaying a sequence of time containers specified in a mark-up language, said method comprising the steps of, for a current time container in said sequence:
  parsing one or more attributes of said current time container, each of said attributes being associated with an event, wherein said event
  (i) comprises a target element contained within content of said current time container, and
  (ii) corresponds to an effect on a further time container in said sequence other than the time container immediately following said current time container in said sequence, said further time container being specified by its position in said sequence relative to the current time container;
  generating a list of said events;
  displaying the content of said current time container; and
  detecting whether an event in said list has occurred, and if an event has occurred said method further comprises the steps of:
  ceasing display of the content of said current time container, and
  instantiating the effect corresponding to said event on said further time container.

According to another aspect of the present invention, there is provided an apparatus for implementing the aforementioned methods.

According to another aspect of the present invention there is provided a computer program product including a computer readable medium having recorded thereon a computer program for implementing the methods described above.

Other aspects of the invention are also disclosed.

BRIEF DESCRIPTION OF THE DRAWINGS

Some aspects of the prior art and one or more embodiments of the present invention will now be described with reference to drawings and appendices, in which.

Appendix A shows an example of the SMIL syntax wherein a set of SMIL time containers is defined.

Appendix B shows an example of the structure of SVG content for paginated display or printing.

Appendix C shows the syntax of an example parent time container having three child time containers.

Appendix D shows a mark-up instruction set provided with the event associated attributes according to embodiments of the present invention and in the manner described with reference to FIG. 3.

Appendix E shows example SVG content wherein a 'beginPrevious' attribute is used.

Appendix F shows another example SVG instruction set wherein a 'beginNext' attribute is used; and Appendix G shows yet another example SVG instruction set including further attributes that allow further control over the relationship of time containers within the instruction set.

DETAILED DESCRIPTION INCLUDING BEST MODE

Methods are described which allow a content author to instantiate an effect on a particular time container by specifying the condition that causes this effect on a different time container, while maintaining the scoping restriction defined for the graphical language being used. This effect is generally related to the display of the particular time container upon a screen.

Figure 1:
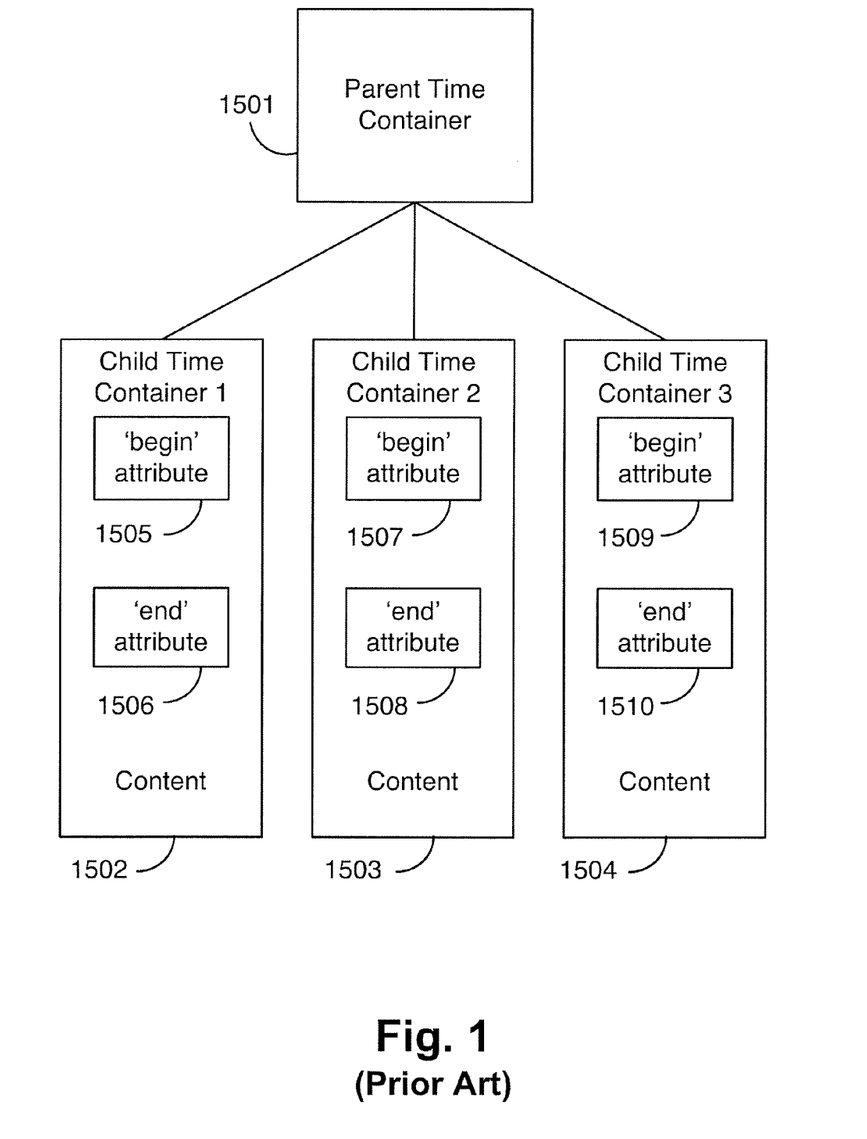
FIG. 1 shows the relationship between a parent and child time containers in the prior art.

Appendix C shows the syntax of an example parent time container having three child time containers. Each of the child time containers contains content that will be displayed only while the particular child time container is active (playing/displaying). The child time container is active between the begin and end times specified on the child time container. Begin and end times/conditions are typically specified with the 'begin' and 'end' attributes. FIG. 1 shows the prior art relationships between the parent and child time containers established by the example syntax in Appendix C. In particular, 3 child time containers 1502, 1503, and 1504 are shown which are associated with a parent time container 1501. The parent time container 1501 could for example be a SMIL 'seq' time container, whereas the child time containers 1502, 1503 and 1504 could be SMIL 'par' time containers. In that case FIG. 1 also reflects the relationship between SVG 'page' elements that are children of an SVG 'pageSet' element.

For reasons explained in the "Background" section, within SVG the child time containers 1502, 1503 and 1504 are restricted by scoping rules which prohibit attributes/elements from referencing other time containers and the content within such other time containers. Hence, cross-referencing between time containers 1502, 1503 and 1504 is prohibited by the scoping rules. If the parent time container 1501 emulates the behaviour of the 'seq' time container defined in SMIL, the child time containers 1502, 1503 and 1504 have an implicit sequence provided by the order in which the child time containers are defined within the parent time container 1501.

Bach child time container 1502, 1503 and 1504 is provided with 'begin' attributes 1505, 1507, and 1509 respectively, as well as 'end' attributes 1506, 1508 and 1510. These attributes 1505 to 1510 define the begin and end conditions for the associated child time containers 1502, 1503 and 1504. The 'begin' and 'end' attributes 1505 to 1510 may be specified in the form of a time relative to the begin time of the parent time container 1501, an event, or other acceptable syntax. Due to the scoping restrictions placed upon the child time containers 1502, 1503 and 1504 the 'begin' and 'end' attributes 1505 to 1510 cannot reference events whose target elements are within other child time containers.

Hence, the scoping restrictions mean that the 'begin' attributes 1505, 1507 and 1509 cannot be used to provide navigation between child time containers 1502, 1503 and 1504 in both directions along the implicit sequence order. The begin times of child time containers 1502, 1503 and 1504 rely upon the implicit begin condition specified for a child of a 'seq' time container, namely immediately after the previous sibling container ends. The 'begin' attribute is only useful for specifying time relative to the implicit begin condition, e.g. 2 seconds after the previous container ends.

Sequential navigation in forward, document, order can be achieved using the implicit begin condition inherent in children of a 'seq' time container. Specifically, the end of a first child time container 1502 will cause the next child time container 1503 in document order to begin.

The 'end' attributes 1506, 1508 and 1510 are used to specify ending conditions. An example of this would be the author specifying that a child time container ends when the user initiates a click event on the graphical representation of an element within the child time container, i.e. a click event with a graphical element within the child time container.

However, hitherto there is no way to override the implicit document order-derived sequence of the child time containers 1502, 1503 and 1504 to provide navigation backwards or to skip child time containers 1502, 1503 and 1504 while still obeying the above-mentioned scoping rules. It is therefore not presently possible for an author of a document to specify, for example, that an event occurring with a target element within child time container 1504, should begin child time containers 1502 or 1503.

Figure 2:
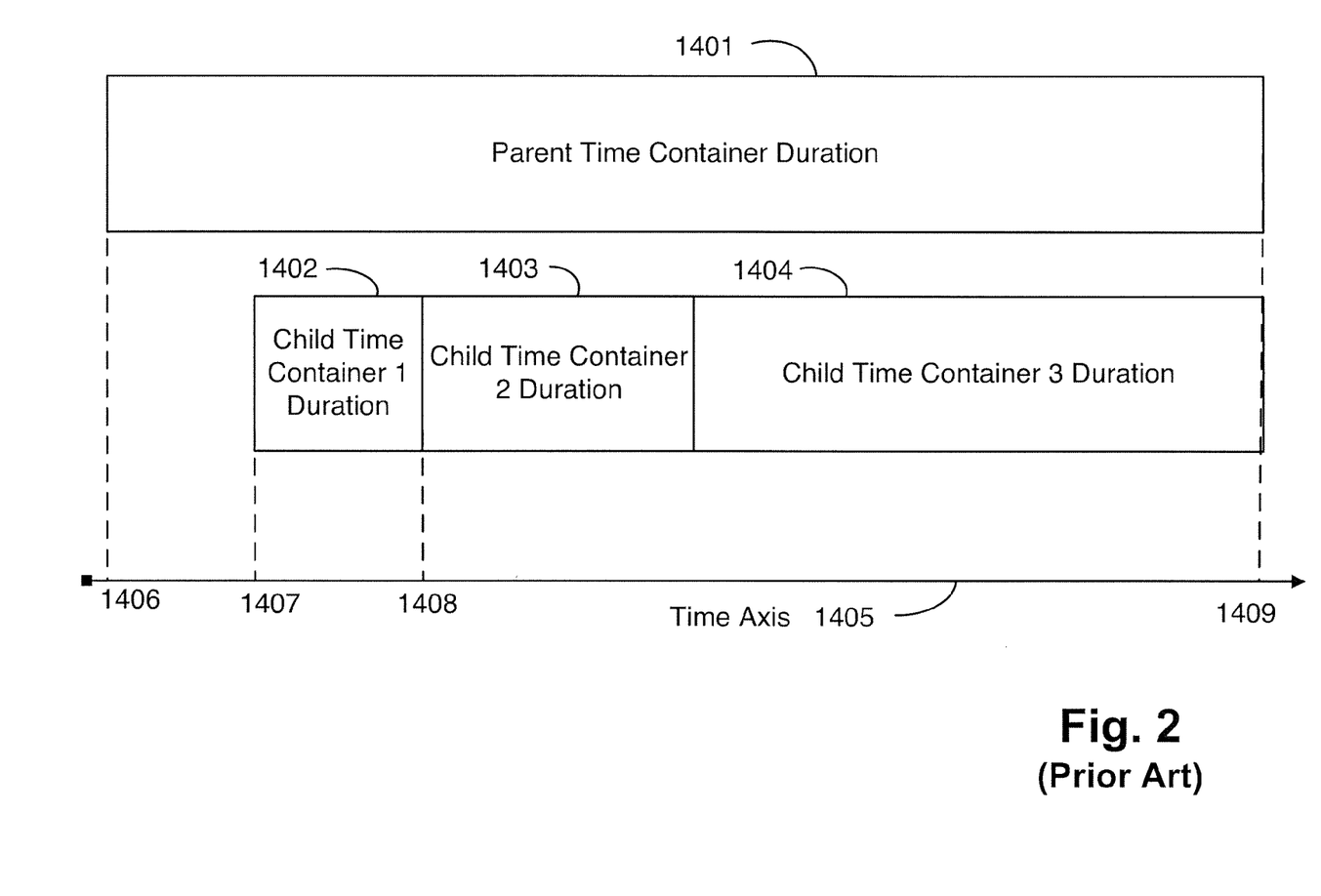
FIG. 2 shows an exemplary timing relationship between the duration of the parent time container shown in FIG. 1 and the duration of child time containers of that parent time container.

FIG. 2 shows the timing relationship between a 'seq'-emulating parent time container duration 1401 and child time container durations 1402, 1403 and 1404 relative to a time axis 1405. It is noted that child time containers can only be active (playing/displaying) while their parent time container is active. While any child time container is active, the content within the child time container will be displayed (ie. played).

The parent time container duration 1401 is an exemplary duration of the parent time container 1501 shown in FIG. 1, whereas the child time container durations 1402, 1403 and 1404 are example durations of the child time containers 1502, 1503 and 1504 shown in FIG. 1. Specifically, the example duration 1402 is that of child time container 1502, the example duration 1403 is that of child time container 1503 and the example duration 1404 is the example duration of child time container 1504. The durations 1401, 1402, 1403 and 1404 may also be representative of the example content shown in Appendix C.

The parent time container 1501 begins at the time instance 1406, and ends at the time instance 1409. The parent time container is said to be active between time instances 1406 and 1409. The first child time container 1502 associated with duration 1402 is active between the begin time instance 1407 and the end time instance 1408. The end time 1408 of the first child time container 1502 also corresponds to the begin time of the second child time container 1503 associated with duration 1403. The child time containers 1502, 1503 and 1504 are played sequentially by the parent time container 1501.

Figure 3:
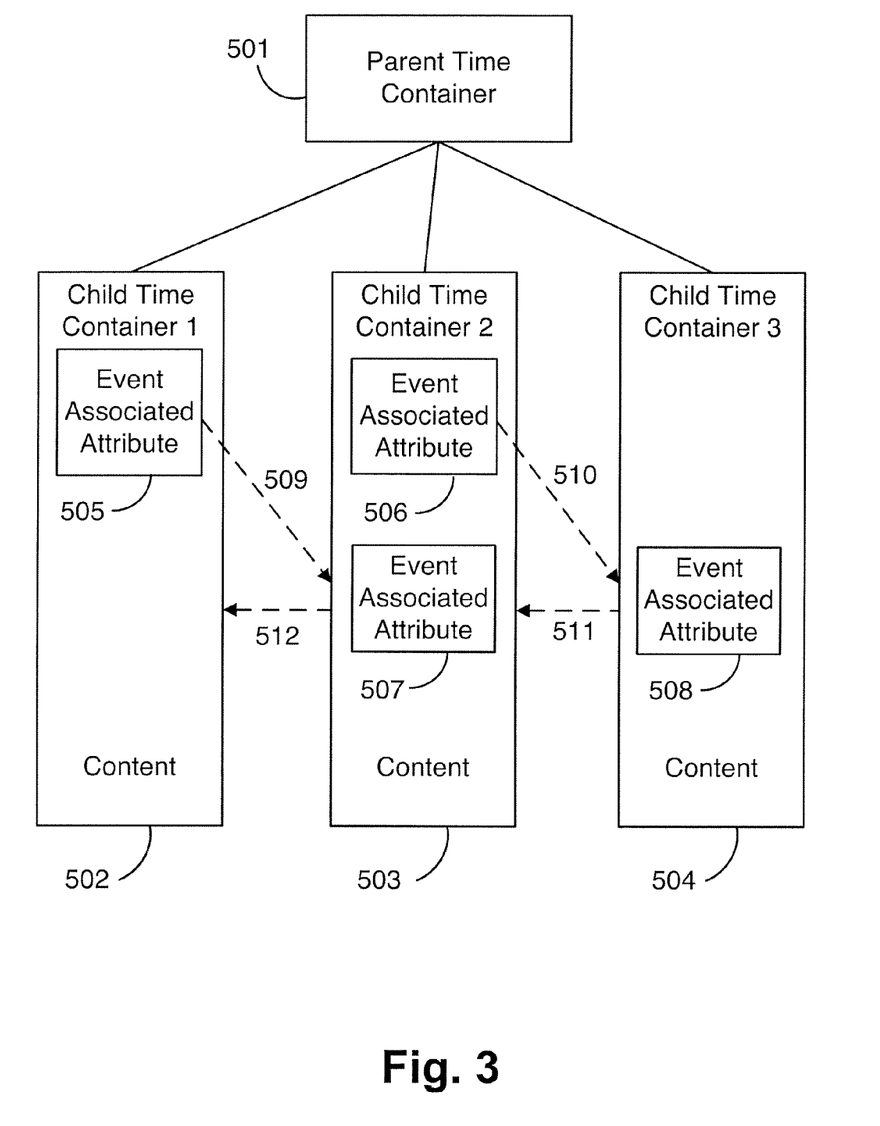
FIG. 3 shows the relationship between parent and child time containers created by a method according to an embodiment of the present invention.

FIG. 3 shows the relationship between a 'seq'-emulating parent time container 501 and child time containers 502, 503 and 504 created with a method according to an embodiment of the present invention. The child time containers 502, 503 and 504 have scoping rules specified which prohibit cross-referencing between time containers, i.e. attributes/elements are prohibited from referencing other time containers and the content within such other time containers.

The child time containers 502, 503 and 504 are provided with event associated attributes 505, 506, 507 and 508, each of which is associated with an event whose target element is within the content of that time container 502, 503 and 504 and which corresponds to an effect on the display of other sibling child time containers. The child time containers 502, 503 and 504 also contain content that is to be rendered when the child time container 502, 503 and 504 is being displayed. The child time containers 502, 503 and 504 could also be provided with prior art timing attributes such as 'begin' and 'end'.

The events associated with the attributes 505, 506, 507 and 508 provided in the child time containers 502, 503 and 504 of FIG. 3 differ from the prior art 'begin' and 'end' attributes shown in FIG. 1 in that they provide a means to provide page navigation in both document order and reverse document order. Accordingly, the attributes 507 and 508 enable functionality that cannot be achieved with the prior art 'begin' and 'end' attributes, that functionality being navigation in reverse document order. Furthermore, the attributes 505 and 506 provide a new way of producing the functionality that can be achieved with the prior art attributes 'begin' and 'end' attributes.

The first child time container 502 is provided with the event associated attribute 505. This attribute 505 is associated with an event whose target element is within the content of child time container 502, such as a 'click' event on the rendered representation of a graphical object. The event has a corresponding effect on the display of the second time container 503, such as specifying the time the second time container 503 is activated. Hence, the occurrence of the event associated with attribute 505, such as the user clicking appropriate content, begins the display (playing) of the second time container 503.

The event associated attribute 505 is provided without contravening any scoping rules specified for the respective child time containers 502, 503 and 504. The event associated attribute 505 is therefore consistent with the scoping rules. The scoping rules are not contravened because the event associated attribute 505 only references a target element within the child time container 502 on which it is specified. The effect of beginning the display of child time container 503 is illustrated through arrow 509.

Similarly, the event associated attribute 506 provided for the second child time container 503 is associated with an event that has a corresponding effect on the display of the third child time container 504. The effect of beginning the display of child time container 504 is illustrated through arrow 510.

The event associated attributes 507 and 508 are provided for child time containers 503 and 504 respectively. These event associated attributes 507 and 508 have an effect on the display of the time containers defined prior to the time containers 503 and 504 respectively, i.e. time containers 502 and 503 respectively. The event associated attribute 507 has a corresponding effect on the time at which the content of the first time container 502 is activated, which is illustrated through arrow 512. Similarly, the event associated attribute 508 has a corresponding effect on the time at which the content of the second time container 503 is activated, which is illustrated through arrow 511.

Appendix D shows a mark-up instruction set provided with the event associated attributes according to embodiments of the present invention and in the manner described with reference to FIG. 3. The three child time containers defined in the mark-up instruction set correspond to the child time containers 502, 503 and 504 respectively. Also, the event associated attribute 505 in FIG. 3 corresponds to the 'event_associated_attribute' attribute shown on the first child time container element in Appendix D. Similarly, the event associated attributes 506 and 507 correspond to the 'event_associated_attribute' attributes shown on the second child time container in Appendix D, whereas the event associated attribute 508 corresponds to the 'event_associated_attribute' shown on the third child time container in Appendix D.

Figure 4:
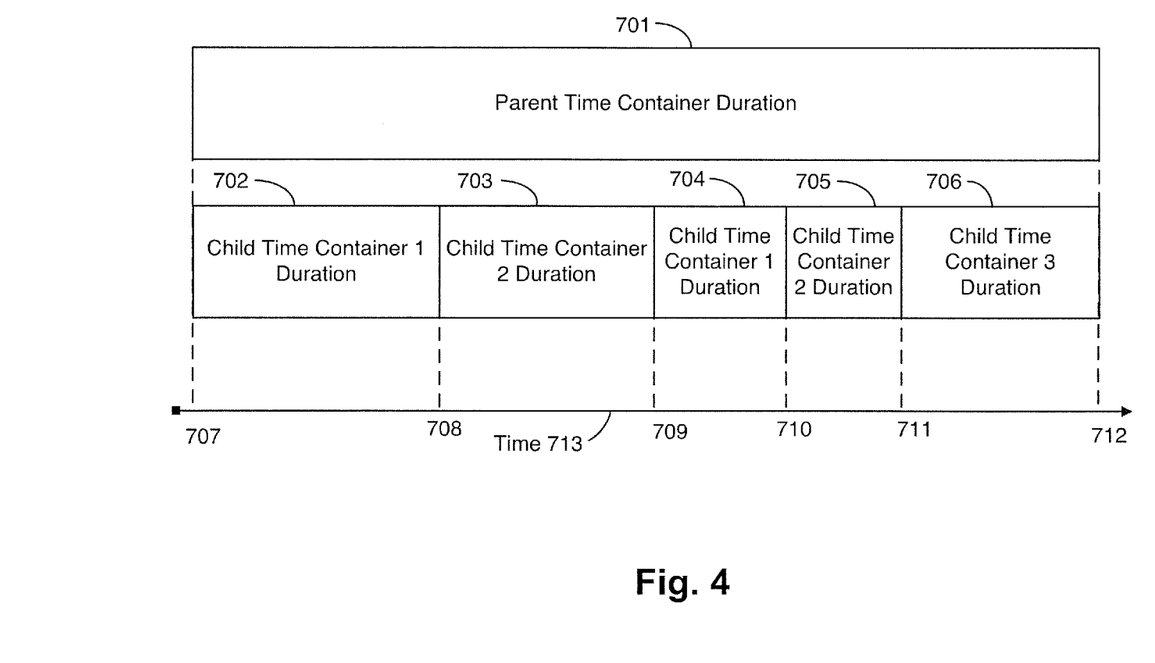
FIG. 4 shows example durations of the time containers shown in FIG. 3.

FIG. 4 shows example durations of time containers that are controlled by the mark-up instruction set shown in Appendix D, and the relationship shown in FIG. 3, on time axis 713. In the example parent time container duration 701 begins at the time instance 707. The first child time container 502 also begins at that time instance 707. During duration 702 the content of the first child time container 502 is displayed. At the time instance 708 the first child time container 502 ends while the second child time container 503 begins, which may be caused by the occurrence of the event specified by the event associated attribute 505, or by the completion of the display of the content of child time container 502. The content of the second child time container 503 is displayed during duration 703, which ends at time instance 709. Also at the time instance 709, first child time container duration 704 begins, which is another occurrence of the first child time container 502. It is noted that the first child time container 502 was already displayed during duration 702. It could be said that the first child time container 502 is being replayed. The effect upon the display of the first child time container 502 at time instance 709 corresponds to the occurrence of the event specified in the event associated attribute 507.

At the time instance 710 the first child container 502 is terminated and the second child time container 503 begins again. The second child time container 503 displays for duration 705, which is another duration of the second child time container 503 because the child time container 503 was already displayed during duration 703. The effect upon the display of the second child time container 503 at time instance 710 corresponds to the occurrence of the event specified in 505 or completion of the display of the content of the child time container 502.

At the time 711, the third child time container 504 begins. The third child time container 504 displays for duration 706. This is caused by the occurrence of the event specified in the event associated attribute 506 or completion of the display of the content of the child time container 503.

At time instance 712 the parent time container 501 ends, ending the display of the current displaying child time container, which is child time container 504 in the example. This is due to a restriction of the SMIL timing model, namely that a child time container cannot be displayed after the parent time container has ended.

Figure 5:
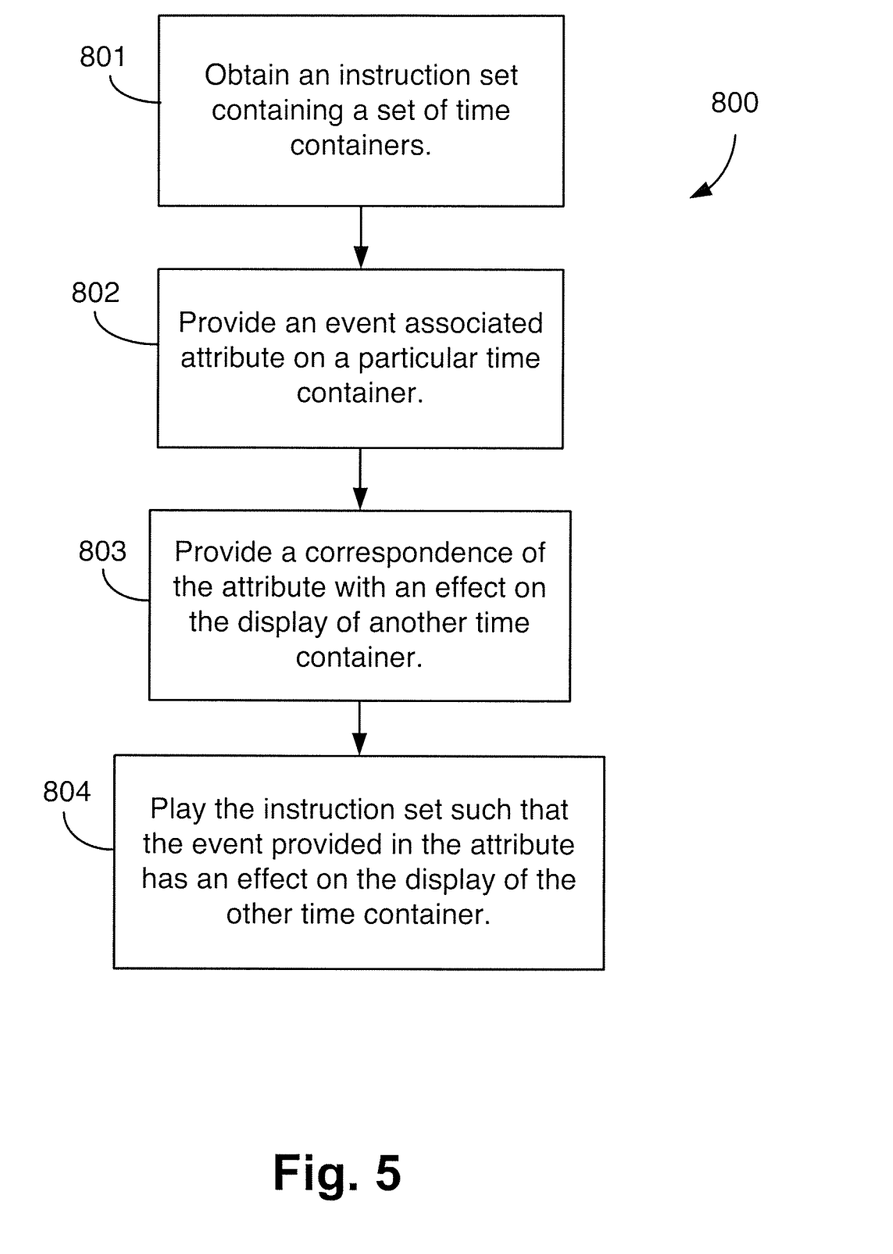
FIG. 5 shows a schematic flow diagram of a method of producing an instruction set according to an embodiment of the present invention.
Figure 6:
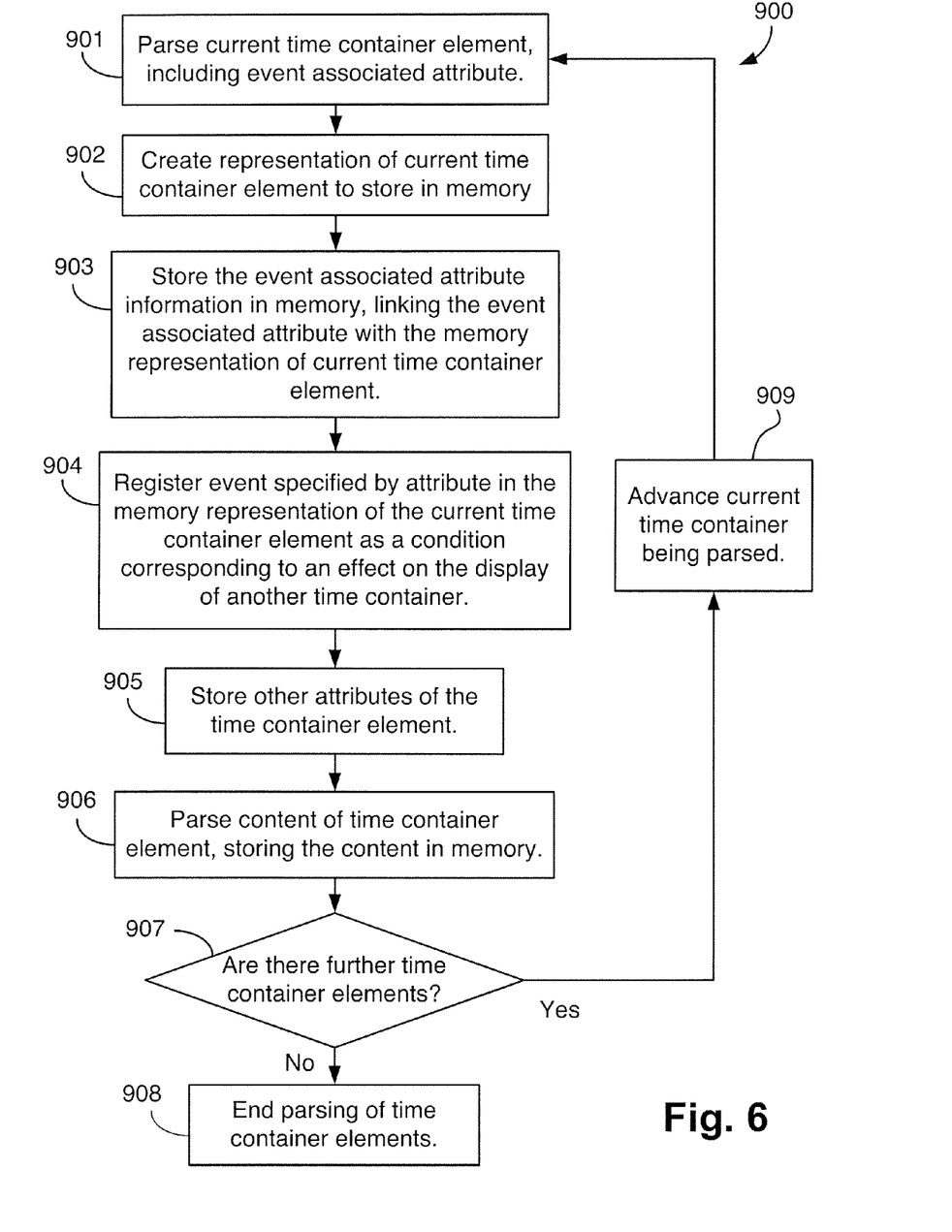
FIG. 6 shows a schematic flow diagram of a method of parsing 'pageSet' elements produced by the method of FIG. 5.
Figure 7:
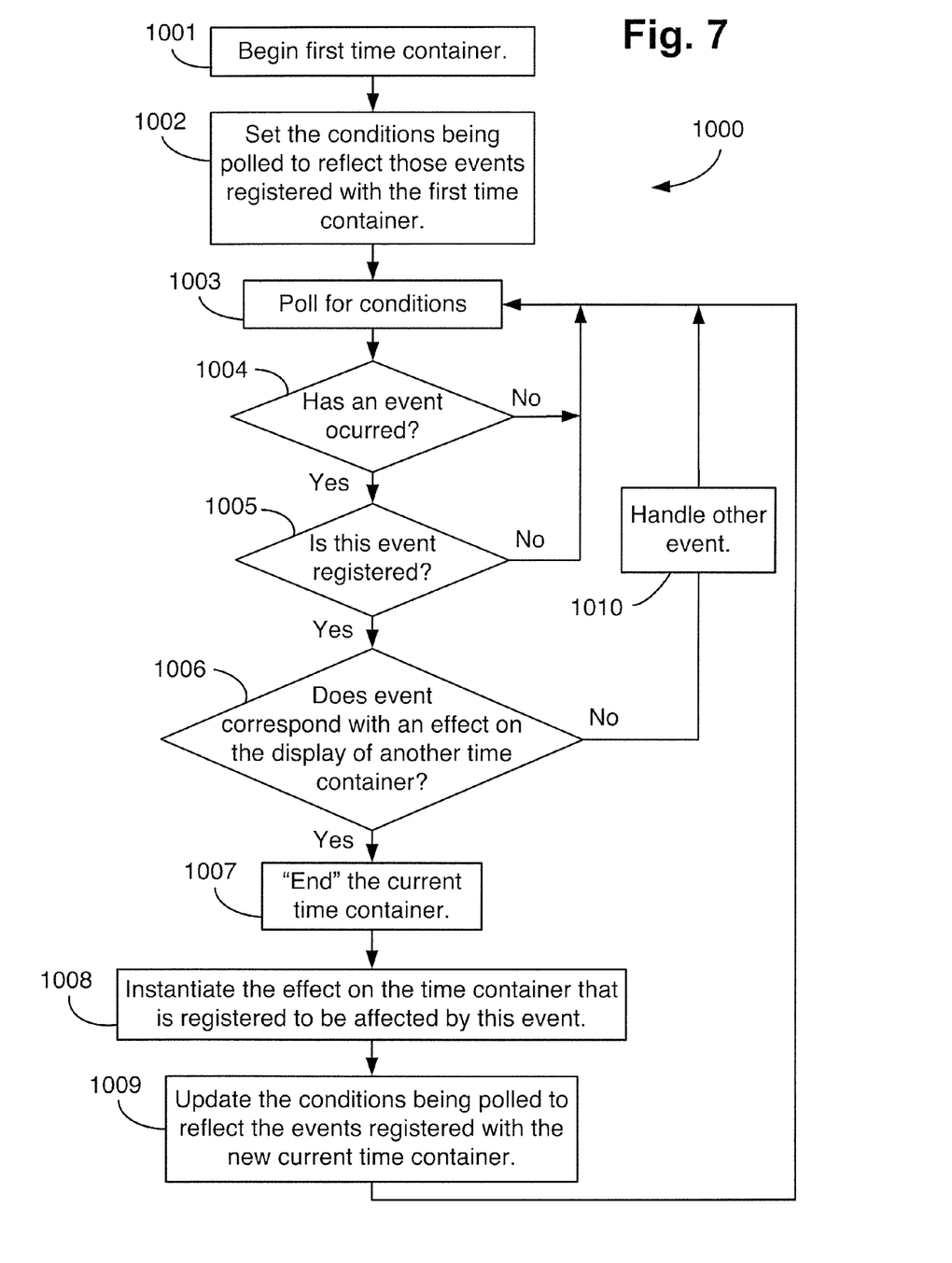
FIG. 7 shows a schematic flow diagram of an event processing method according to an embodiment of the present invention.

FIG. 5 shows a method 800 according to an embodiment of the present invention, of producing and playing an instruction set that provides attributes of a particular time container that are associated with events whose target element is within the particular time container and whose occurrence triggers an effect on the display of a different (sibling) time container. FIG. 6 shows a method 900 of creating an in-memory representation of the document containing the instruction set produced by the method 800. FIG. 7 shows a process 1000 by which the content of time containers that may have been parsed by a process similar to method 900 (FIG. 6) is displayed.

Figure 8:
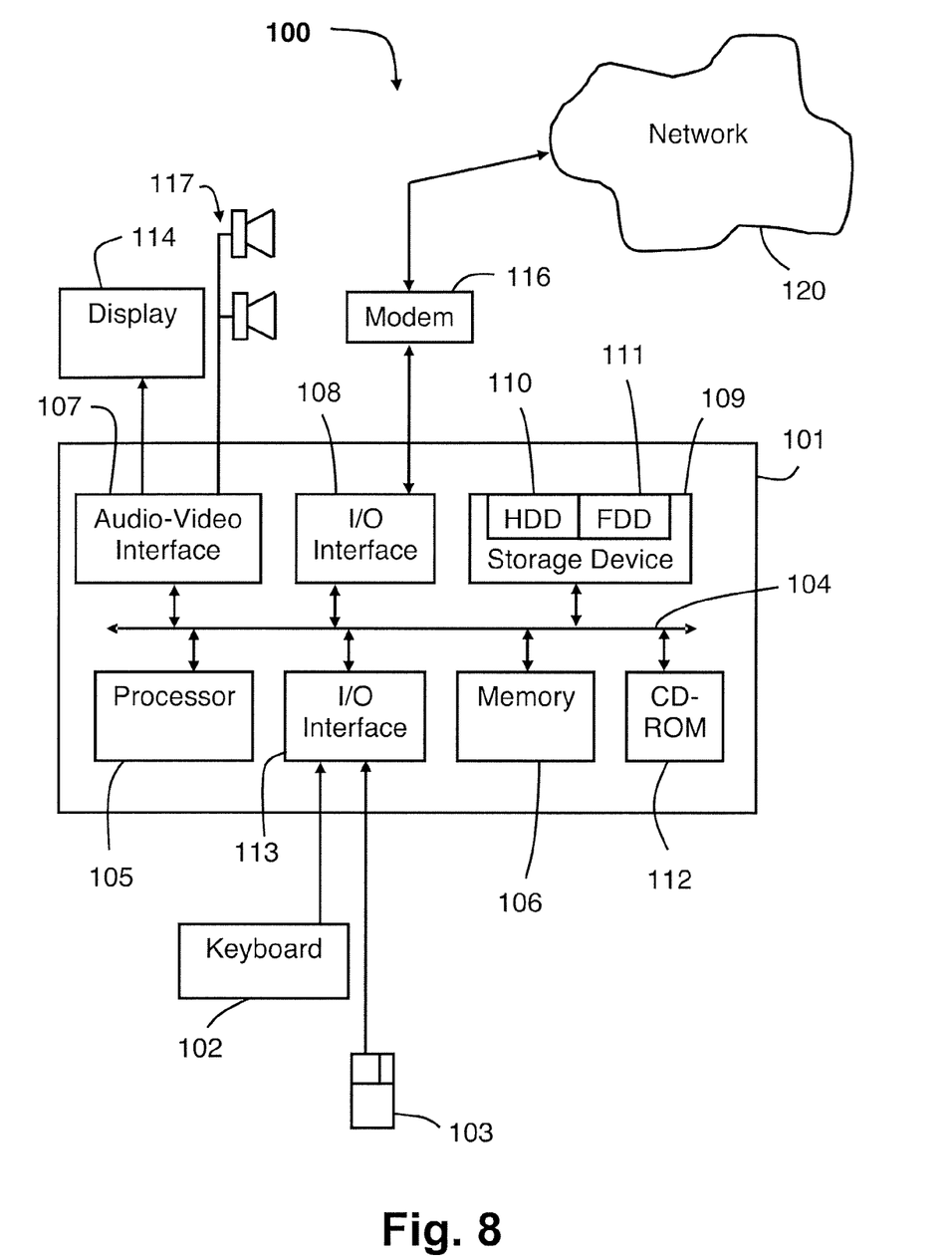
FIG. 8 shows a standard personal computer on which the embodiments of the invention may be practised.

The methods 800, 900 and 1000 are preferably practiced using a general-purpose computer system 100, such as that shown in FIG. 8, wherein the processes of FIGS. 5, 6 and 7 may be implemented as software, such as an application program executing within the computer system 100. In particular, the steps of methods 800, 900 and 1000 are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product.

The computer system 100 is formed by a computer module 101, input devices such as a keyboard 102 and mouse 103, output devices including a display device 114 and loudspeakers 117. A Modulator-Demodulator (Modem) transceiver device 116 is used by the computer module 101 for communicating to and from a communications network 120 such as the Internet, or other network systems, such as a Local Area Network (LAN) or a Wide Area Network (WAN).

The computer module 101 typically includes at least one processor unit 105, and a memory unit 106. The module 101 also includes an number of input/output (I/O) interfaces including an audio-video interface 107 that couples to the video display 114 and loudspeakers 117, an I/O interface 113 for the keyboard 102 and mouse 103, and an interface 108 for the modem 116. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art.

Typically, the application program is resident on the hard disk drive 110 and read and controlled in its execution by the processor 105. In some instances, the application program may be supplied to the user encoded on a CD-ROM or floppy disk and read via the corresponding drive 112 or 111, or alternatively may be read by the user from the network 120 via the modem device 116.

Method 800 (FIG. 5) starts in step 801 where an instruction set is obtained containing a set of time containers. The time containers include instructions for content which is to be displayed while that particular time container is active. Such an instruction set may be created by an author in a computer application, such as an animation authoring tool or a text editor; or the instruction set may be generated by another application.

In step 802 one of the set of time containers is provided with an event associated attribute. The target element of the event associated with the event associated attribute is within the particular time container, i.e. in the content of the time container.

Step 803 provides a correspondence between this event and an effect on the display of another time container. The effect may be to begin that other time container. Steps 802 and 803 may be repeated to provide such an event associated attribute for any number of time containers within the instruction set.

In step 804 the instruction set containing the time containers is played such that while the time container in which the event associated attribute is provided is active, upon the occurrence of the event specified by the event associated attribute, the corresponding effect provided in step 803 is instantiated on the display of the other time container. This relationship of the event to the effect will hold for all of the time containers provided with such an event associated attribute by repeated execution of steps 802 and 803.

FIG. 6 shows the method 900 of creating an in-memory representation of the document containing the instruction set produced by the method 800 described above with reference to FIG. 5. Parsing the instruction set to create an in-memory representation may be necessary to play the instruction set in step 804 of method 800 and to ensure the occurrence of an event, specified in the instruction set in step 802, within a particular time container instantiates the appropriate effect, specified in step 803, on the other time container.

Method 900 starts in step 901 where the current time container is parsed. Step 902 then creates an in-memory representation of the current time container. In step 903 which follows a representation of each event associated attribute, if any are present, is stored in memory and linked to the current time container. This event associated attribute is associated with an event for which the target element is contained within the current time container. The memory representation of this event associated attribute will contain information about the event and target element. The memory representation may also contain information about the corresponding effect that should be instantiated on another time container.

The processor 105 then in step 904 registers the event specified by the event associated attribute with the memory representation of the current time container. This event is now registered with the current time container. In one implementation the process of registration simply involves adding an entry containing/indicating appropriate information to a list of registered events for the current time container. This event registration entry may indicate that this event causes an effect on the display of a second time container. Alternatively, the process of registration may be a more complicated process related to the global handling of events within the entire instruction set. Irrespective of the method used to register the event specified by the event associated attribute with the memory representation of the current time container, the important point is that the event is registered such that when that event occurs it causes the effect on another time container.

Step 905 follows where the processor 105 stores other attributes of the time container in memory 106. In step 906 the processor 105 parses the content of the time container and stores the parsed content also in memory 106.

It is then determined in step 907 whether further time containers exist in the instruction set. If it is determined that another time container exists, that other time container becomes the current time container in step 909 and steps 901 to 906 are repeated with the (new) current time container. Alternatively, if it is determined in step 907 that no other time containers exist, the parsing of time containers ends in step 908.

FIG. 7 shows the process 1000 by which the content of time containers that may have been parsed by a process similar to method 900 described with reference to FIG. 6 is displayed such that occurrences of events with a target element within a particular time container are registered to instantiate an effect on the display of content of another time container. The particular time container under consideration starts (begins to be displayed) in step 1001. The conditions being polled to reflect the events registered for the time container under consideration and any events that may be registered globally for all time containers are set in step 1002. This includes the events registered in step 904 to cause effects on another time container. The method 1000 then polls in step 1003 for conditions, checking to see if any of the conditions are true, thereby indicating that an event has occurred. In step 1004 the processor 105 then tests whether an event has occurred. In the case where no event has occurred control returns to step 1003. If it is determined in step 1004 that an event has occurred, control passes to step 1005 where the processor 105 determines whether the event that occurred is registered in memory 106. If the event is not registered, the event does not need to be processed and control returns to step 1003.

If it is determined in step 1005 that the event is registered, and therefore needs to be processed, control passes to step 1006 where the processor 105 determines whether the event corresponds to an effect on the display of the content of another time container. If it is determined that the event does not fulfil this condition (for instance the event may be registered to initiate a script or animation), the event is handled in step 1010 before control returns to step 1003. However, if it is determined that the event does correspond to an effect on the display of the content of another time container (i.e. the event was specified by an instruction set produced according to the method 800), control proceeds to step 1007 where the display of the currently displayed time container is ended. In step 1008 the effect on the display of the other time container that the event of step 1004 corresponded to is then instantiated. Typically this effect is to begin the display of the other time container. This other time container is now the new current time container being displayed.

Control then proceeds to step 1009 where the conditions being polled are updated to reflect the events registered within the new current time container while maintaining any events globally registered. Control then returns to step 1003 from where the processor 105 polls for events registered globally or within the new current time container, and if a registered event within this (new) current time container is detected which corresponds to an effect on the display of the content of other time containers, which may include any of the time containers previously defined as current time containers, the current time container is ended in step 1007 and the other time container is started in step 1008.

The methods 900 (FIG. 6) and 1000 may be executed simultaneously in the system 100 where multiple processes can be performed simultaneously. The obvious restriction is that time containers and their contents cannot be displayed until they are parsed.

A particular implementation of the present disclosure allows an author to control the timing of elements within a sequential time container ('page' elements within a 'pageSet' element) by specifying timing conditions on sibling time containers (pages) of the time container the author wishes to control. The implementation allows this behaviour while still maintaining the scoping restrictions on time container elements in the instruction set that allow efficient printing.

In accordance with one implementation a 'beginPrevious' attribute is provided in an instruction set. The 'beginPrevious' attribute may be applied to the SVG 'page' element. The SVG 'page' element has the timing behaviour of a SMIL 'par' time container. A SVG 'page' element is always the child of a SVG 'pageSet' element. The SVG 'pageSet' element has the timing behaviour of a SMIL 'seq' time container.

This 'beginPrevious' attribute allows any 'page' element to specify a list of conditions, such as times or events that cause a sibling 'page' element defined previously in document order to be displayed. The syntax of the 'beginPrevious' attribute is identical to the syntax of the 'begin' attribute.

The conditions specified by the 'beginPrevious' attribute on a 'page' element cause the previous sibling 'page' element in document order to begin. This means that the previous sibling 'page' element begins as though the condition that has occurred was specified in the 'begin' attribute of that previous sibling 'page' element.

Using the prior art attributes to provide this functionality would break the scoping restrictions on the 'page' elements. The only way to achieve the functionality achieved with embodiments of the present invention with the 'begin' attribute of the prior art is to place a 'begin' attribute on the previous 'page' element specifying a begin condition which is an event with a target element within the present 'page' element. This would disobey the scoping rules as the previous page would reference content within a subsequent page.

The 'beginPrevious' attribute is consistent with the scoping rules as it is placed on a particular page and specifies an event with a target element within that particular 'page' element. The 'beginPrevious' attribute provides navigation in reverse document order while still obeying the scoping rules specified by the SVG language.

An example use of the 'beginPrevious' attribute within SVG content is shown in Appendix E. Attributes necessary to describe the presentation of the elements are omitted from this example for clarity. The 'pageSet' element contains 4 'page' elements having page ids (identifiers) 'pageone', 'pagetwo', 'pagethree' and 'pagefour' respectively.

The first 'page' element in document order having page id 'pageone' renders some text, 'FORWARD' along with other content represented by the 'content' element. It is noted that the 'content' element is not part of the SVG language, and is merely used for illustrative purposes. The 'begin' and 'end' attributes are specified on the first 'page' element. These attributes specify that the first 'page' time container's content will be displayed from 0 seconds (relative to the start time of the parent time container, which is the 'pageSet' element) until the user initiates a click event on the element with id='pageoneend' (ie. the target element of the click event, namely the text element 'FORWARD').

The effect of the first 'page' element will be to render a page of content including the text 'FORWARD' at a particular position. When the user clicks the text 'FORWARD' with a pointing device, such as the mouse 103 or stylus (not illustrated), displaying of the first 'page' element ends and the next 'page' element in document order, which is the second 'page' element having page id 'pagetwo', begins.

The second 'page' element in document order and having id 'pagetwo' contains example content and two 'text' elements. The two text elements render the text 'BACK' and 'FORWARD' respectively. The second 'page' element has 2 timing attributes specified, 'end' and 'beginPrevious'. The page ends when a click event occurs with target element with id 'pagetwoend' in which case the next 'page' element in document order begins. The target element with id 'pagetwoend' is the text element that indicates rendering of the text 'FORWARD'. Even though the page lacks an explicit 'begin' attribute, the implicit timing constraints of the 'pageSet' element mean that by default this page will begin after the first page has ended.

The 'beginPrevious' attribute specifies that when a click event occurs with target element of id 'pagebacktwo', the previous time container in the sequence in document order begins (ending the second 'page' element). The target element with id 'pagebacktwo' is the 'text' element that indicates rendering of the text 'BACK'. The previous time container in the sequence is the first 'page' element. Accordingly, the first 'page' element in document order begins when the user clicks the text 'BACK' in the content of the second 'page' element.

The behaviour outlined for the second 'page' element of this example demonstrates the behaviour of the 'beginPrevious' attribute. The attribute 'beginPrevious' allows a content author to instantiate an effect on a preceding time container by specifying the condition that causes this event on a present time container, while maintaining the scoping restriction of the language. The effect in this example is the termination of the second 'page' element, and display (beginning) of the first 'page' element's content through a condition in the second 'page' element. The condition in the example is a click event associated with the target element having id 'pagebacktwo', which is the 'text' element rendering the text 'BACK' within the second 'page' element.

The third 'page' element in the example shown in Appendix B also contains example content and two 'text' elements. The third 'page' element ends when a click event occurs with the target element of id 'pagethreeend', ie. the text element 'FORWARD'. When the user clicks on the rendering of the 'text' element with id 'pagebackthree', ie. the text element 'BACK', the third 'page' element also ends and the previous 'page' element, which is the second 'page' element begins.

The fourth 'page' element similarly contains a 'beginPrevious' attribute that specifies an event that should correspond to the effect of beginning the previous 'page' element. The implicit timing constraints of the 'pageSet' element mean that by default this page will begin after the third page has ended.

Appendix F shows an example instruction set containing a 'beginNext' attribute in accordance with an alternate implementation of the present invention. The 'beginNext' attribute indicates a condition that begins the next sibling time container in document order within a 'seq' time container, in this case the next 'page' element. As will be described in detail, the use of the 'beginNext' and 'beginPrevious' attributes provides a clearer syntax than using 'begin', 'end' and 'beginPrevious'. The instruction set shown in Appendix F also includes the 'beginPrevious' attribute described above with reference to Appendix E.

A 'pageSet' element is shown comprising 4 'page' elements. The first 'page' element of this example has a 'beginNext' attribute specifying that the second 'page' element should begin (thereby ending the first 'page' element) when the user initiates a click event on the element with target element id 'pageoneend'. In the example the target element with id 'pageoneend' renders the text 'FORWARD'.

The second 'page' element in document order includes both the 'beginNext' attribute and the 'beginPrevious' attribute. The 'beginNext' attribute on the second 'page' element indicates that when the user clicks the rendering of the element with id 'pagetwoend', the next 'page' element, which is the third 'page' element in document order, should begin (thereby ending the second 'page' element). The 'beginPrevious' attribute on the second 'page' element indicates that when the user clicks the rendering of the element with id 'pagebacktwo', the previous 'page' element, which is the first 'page' element in document order, should begin (thereby ending the second 'page' element).

The third and fourth 'page' elements in document order also show examples of the 'beginNext' and 'beginPrevious' attributes to similarly specify effects on the display of other time containers, which operate in a manner similar to that described above for the second 'page' element.

As can be seen from the above example, the 'beginNext' attribute of a particular time container indicates an event whose target element is within that time container. The occurrence of the event causes the content of a next time container in document order to be displayed.

The 'beginPrevious' and 'beginNext' attributes described above provide means for a content author to instantiate an effect on a preceding or following time container by specifying the condition that causes this event on a present time container, while maintaining the scoping restriction of the language. A further implementation of the present invention provides a means that allows the author to specify an effect on the display of content from any sibling time container within a sequence. Appendix G shows an example instruction set including further attributes that allow an author further control over the relationship of time containers within the instruction set.

In this particular implementation the first time container, which is the first 'page' element in document order, specifies events, and also contains the target elements of the events. The first 'page' element includes 'beginIndex' and 'beginEvent' attributes. These 'beginIndex' and 'beginEvent' attributes are both able to specify single values or a list of values. If a list is specified for either attribute, a list of the same length should be specified for the other attribute. The entries in each list correspond with each other, i.e. the first entry in 'beginIndex' corresponds to the first entry in 'beginEvent'.

The 'beginEvent' attribute indicates one or more events, each event having target elements within the particular time container on which the 'beginEvent' attribute is specified and operative to instantiate a display effect on another time container. That is, these events will end the particular time container and begin another time container. The other time container is indicated by the corresponding 'beginIndex' value, i.e. the first 'beginEvent' value in a list corresponds to the first 'beginIndex' value in a list, etc . . . . There will be an effect upon the display of the other time container when the corresponding event occurs.

The 'beginIndex' attribute indicates the other time container, the time container on the display of which an effect will be instantiated, i.e. the time container that will begin when the event occurs. The index is a relative index, relative to the present time container on which the attribute is specified. Preferably, the index indicates the number of sibling time containers required to be traversed, starting from the current time container, to locate the time container on the display of which the effect should be instantiated. For example, if the index is 1, this indicates that the effect should be instantiated on the next sibling time container in document order. If the index is −1 this indicates that the effect should be instantiated on the previous sibling time container in document order.

These attributes allow an arbitrary association of time containers, providing navigation between any pair of time containers. The example in Appendix G shows the use of the instruction set described above to specify a slide presentation/paginated document.

The first 'page' element in Appendix G specifies a 'beginEvent' attribute with two events, a click event with the target element of id 'pageoneend' and a click event with the target element of id 'skiptolast'. These events will instantiate the display of the pages indicated by the respective values in the 'beginIndex' list.

The 'beginIndex' list for the first 'page' element in Appendix G specifies the values 1 and 3. The first event specified in the 'beginEvent' attribute, 'pageoneend.click', therefore causes the second 'page' element in the 'pageSet' to be displayed (begun). The second 'page' element is the 'page' element one element forward in document order. The second event specified in the list in the 'beginEvent' attribute, with target element id='skiptolast' i.e. a text element 'SKIP TO LAST', causes the 'page' element 3 pages forward in document order from the first page, namely the fourth or last page, to be displayed (begun).

The 'beginEvent' and 'beginIndex' attributes of the second 'page' element in Appendix G provide functionality analogous to the 'beginNext' and 'beginPrevious' attributes described earlier. The values specified for 'beginIndex' indicate that the first event specified in the 'beginEvent' attribute initiates the display (begin) of the third 'page' element in Appendix G (analogous to providing 'beginNext'), the second event specified in the 'beginEvent' attribute initiates the display (begin) of the first 'page' element in Appendix G (analogous to providing 'beginPrevious').

The third and fourth 'page' elements show further examples of the use of the 'beginEvent' and 'beginIndex' attributes on a time container to specify effects on the display of other time containers.

The 'beginEvent' and 'beginIndex' implementation exemplified in Appendix G demonstrates applicability beyond simple page next and page back behaviour. This implementation shows arbitrary page skipping functionality while abiding by the syntactical scoping restrictions necessary for efficient printing of documents.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

APPENDIX A

```
<smil>
    <seq>
        timed content 1
        <par>
            timed content 2
            timed content 3
        </par>
        <par>
            timed content 4
        </par>
        timed content 5
        <par>
            timed content 6
        </par>
    </seq>
</smil>
```

APPENDIX B

```
<svg>
    global resources or graphics
    <pageSet> content of first page content of second page content of third page

<pageSet>
</svg>
```

APPENDIX C

```
<parent>
    <child begin = "BEGIN" end = "END">
        content...
    </child>
    <child begin = "BEGIN" end = "END">
        content...
    </child>
    <child begin = "BEGIN" end = "END">
        content...
    </child>
</parent>
```

APPENDIX D

```
<parent>
    <child event_associated_attribute="event" >
        content...
    </child>
    <child event_associated_attribute="event"
           event_associated_attribute="event">
        content...
    </child>
    <child event_associated_attribute="event">
        content...
    </child>
</parent>
```

APPENDIX E

```
<svg>
    <pageSet begin = "0s">

<content/>
            <text id = "pageoneend">FORWARD</text>
```

APPENDIX E-continued

```

<content/>
            <text id = "pagebacktwo">BACK</text>
            <text id = "pagetwoend">FORWARD</text>

<page id = "pagethree" end = "pagethreeend.click" beginPrevious = "pagebackthree.click">
            <content/>
            <text id = "pagebackthree">BACK</text>
            <text id = "pagethreeend">FORWARD</text>

<content/>
            <text id = "pagebackfour">BACK</text>
            <text id = "pagefourend">END</text>

</pageSet>
</svg>
```

APPENDIX F

```
<svg>
    <pageSet begin = "0s">

<content/>
            <text id = "pageoneend">FORWARD</text>

<page id = "pagetwo" beginNext = "pagetwoend.click" beginPrevious = "pagebacktwo.click">
            <content/>
            <text id = "pagebacktwo">BACK</text>
            <text id = "pagetwoend">FORWARD</text>

<page id = "pagethree" beginNext = "pagethreeend.click" beginPrevious = "pagebackthree.click">
            <content/>
            <text id = "pagebackthree">BACK</text>
            <text id = "pagethreeend">FORWARD</text>

<content/>
            <text id = "pagebackfour">BACK</text>
            <text id = "pagefourend">END</text>

</pageSet>
</svg>
```

APPENDIX G

```
<svg>
    <pageSet begin = "0s">
        <page id = "pageone" begin = "0s" beginIndex = "1, 3" beginEvent= "pageoneend.click, skiptolast.click">
            <content/>
            <text id = "pageoneend">FORWARD</text>
            <text id = "skiptolast">SKIP TO LAST</text>

<page id = "pagetwo" beginIndex = "1, -1" beginEvent= "pagetwoend.click, pagetwoback.click">
            <content/>
            <text id = "pagetwoback">BACK</text>
            <text id = "pagetwoend">FORWARD</text>

<page id = "pagethree" beginIndex = "1, -1" beginEvent= "pagethreeend.click, pagethreeback.click">
            <content/>
            <text id = "pagethreeback">BACK</text>
            <text id = "pagethreeend">FORWARD</text>

<page id = "pagefour" end = "pagefourend.click" beginIndex =
```

APPENDIX G-continued

```
"-1" beginEvent= "pagefourback.click">
    <content/>
    <text id = "pagefourback">BACK</text>
    <text id = "pagefourend">END</text>

</pageSet>
</svg>
```

The claims defining the invention are as follows:

1. A method of producing an instruction set, wherein the instruction set conforms to the Scalable Vector Graphics specification, and the time containers are 'page' child elements of a 'pageSet' parent element, for rendering on a graphic display, the instruction set comprising a sequence of time containers to be rendered, each said-of the time containers containing at least one timed element to be displayed on the graphic display, wherein the instruction set obeys a rule prohibiting a-each of the time containers from referencing, in a condition of an event associated with the time container, the content of a different one of the time containers, said method comprising the steps of:

adding an event-associated attribute to a particular one of the time containers being a page element, the event-associated attribute being associated with an event, the event having a condition which references a target element adding the target element to the particular time container as a child element of the page element, the target element initiating the event; and providing a correspondence between the event-associated attribute and an effect on the display of a different one of the time containers trigger, the correspondence triggering the effect when the event occurs of beginning the display of the different time container, wherein the different time immediately follows the particular time container in the sequence, in a manner consistent with the rule.

2. A method as claimed in claim 1, further comprising the step of rendering the instruction set to the graphic display, said rendering instantiating the effect on the display of the different time container upon an occurrence of the event.

3. An apparatus for producing an instruction set, wherein the instruction set conforms to the Scalable Vector Graphics specification, and the time containers are 'page' child elements of a 'pageSet' parent element, for rendering on a graphic display, the instruction set comprising a sequence of time containers to be rendered, each of the time containers containing at least one timed element to be displayed on the graphic display, wherein said instruction set obeys a rule prohibiting each of the time containers from referencing, in a condition of an event associated with the time container, the content of a different one of the time containers, said apparatus comprising:

a first adding unit which adds an event-associated attribute to a particular one of the time containers being a page element, the event-associated attribute being associated with an event, the event having a condition which references a target element;

a second adding unit which adds the target element to the particular time container as a child element of the pare element, the target element initiating the event; and a providing unit which provides a correspondence between the event-associated attribute and an effect on the display of a different one of the time containers, the correspondence triggering the effect when the event occurs of beginning the display of the different time container, wherein the different time immediately follows the particular time container in the sequence, in a manner consistent with the rule.

4. An apparatus as claimed in claim 3, further comprising a rendering unit which renders the instruction set to the graphic display, the rendering instantiating the effect on the display of the different time container upon an occurrence of the event.

5. A non-transitory computer-readable storage medium having recorded thereon a computer program for causing a computer to execute a method of producing an instruction set, wherein the instruction set conforms to the Scalable Vector Graphics specification, and the time containers are 'page' child elements of a 'pageSet' parent element, for rendering on a graphic display, the instruction set comprising a sequence of time containers to be rendered, each of the time containers containing at least one timed element to be displayed on the graphic display, wherein the instruction set obeys a rule prohibiting a-each of the time containers from referencing, in a condition of an event associated with the time container, the content of a different one of the time containers, the method comprising the steps of:

adding an event-associated attribute to a particular one of time of the time containers, the event-associated attribute being associated with an event, the event having a condition which references a target element;

adding the target element to the particular time container as a child element of the page element, the target element initiating the event; and providing a correspondence between the event-associated attribute and an effect on the display of a different of the time containers, the correspondence triggering the effect when the event occurs of beginning the display of the different time container, wherein the different time container immediately follows the particular time container in the sequence, in a manner consistent with the rule.

6. A method of displaying a sequence of time containers, specified in a mark-up language, wherein the elements of the mark-up language conform to the Scalable Vector Graphics specification, and the time containers are 'page' child elements of a 'pageSet' parent element, that obey a rule prohibiting each of the time containers from referencing, in a condition of an event associated with the time container, the content of a different one of the time containers, said method comprising the steps of, for a current one of the time containers in the sequence:

parsing one or more attributes of a pare element that defines the time container that obeys the rule, each of the attributes being associated with an event, wherein the event (i) comprises a condition involving a target element that is a child element of the page element within of the current time container, the target element initiating the event, and (ii) corresponds to an effect on different one of the time containers in the sequence other than the time container immediately following said-the current time container in said-the sequence such that the event triggers the effect when the event occurs of beginning the display of the different time container, the different time container being specified by its position in the sequence relative to the current time container; generating a list of the events; displaying the content of the current time container; and detecting whether an event in the list has occurred, wherein if an event has occurred said method further comprises the steps of: ceasing display of the content of the current time container; and instantiating the effect corresponding to the event on the different time container in accordance with the rule.

7. A method according to claim 6, wherein the other time container precedes the current time container in the sequence.

8. A method according to claim 6, wherein the different time container is specified by an integer indicating the number of time containers required to be traversed starting from the current time container to locate the different time container.

9. An apparatus for displaying a sequence of time containers specified in a mark-up language, wherein the elements of the mark-up language conform to the Scalable Vector Graphics specification, and the time containers are 'page' child elements of a 'pageSet' parent element, that obey a rule prohibiting each of the time containers from referencing, in a condition of an event associated with the time container, the content of a different one of the time containers, said apparatus comprising, for a current one of the time containers in the sequence:

a parsing unit which parses one or more attributes of element that defines the current time container that obeys the rule, each of the attributes being associated with an event, wherein the event
  (i) comprises a condition involving a target element that is child element of the page element within of the current time container, the target element initiating the event, and
  (ii) corresponds to an effect on a different one of the time containers in the sequence other than a-the time container immediately following the current time container in the sequence such that the event triggers the effect when the event occurs of beginning the display of the different time container, the different time container being specified by its position in the sequence relative to the current time container;
a generating unit which generates a list of the events;
a displaying unit which displays the content of the current time container;
detecting unit which detects whether an event in the list has occurred;
a ceasing unit which, if occurrence of an event is detected by said unit, ceases display of the content of the current time container; and
an instantiating unit which, if occurrence of an event is detected by said unit, instantiating instantiates the effect corresponding to the event on the different time container in accordance with the rule.

10. A non-transitory computer-readable storage medium having recorded thereon a computer program for implementing a method of displaying a sequence of time containers specified in a mark-up language, wherein the elements of the mark-up language conform to the Scalable Vector Graphics specification, and the time containers are 'page' child elements of a 'pageSet' parent element, that obey a rule prohibiting each of the time containers from referencing content of a different one of the time containers, the method comprising the steps of, for a current time container in the sequence:

parsing one or more attributes of a pare element that defines the current time container, each of the attributes being associated with an event, wherein the event
  (i) comprises a condition involving a target element that is a child element of the page element within of the current time container, the target element initiating the event, and
  (ii) corresponds to an effect on a different one of the time containers in the sequence other than the time container immediately following the current time container in the sequence, such that the event triggers the effect when the event occurs of beginning the display of the different time container, the different time container being specified by its position in the sequence relative to the current time container;
generating a list of the events; displaying the content of the current time container;
and detecting whether an event in the list has occurred, wherein if an event has occurred said method further comprises the steps of:
  ceasing display of the content of the current time container; and
  instantiating the effect corresponding to the event on the different time container in accordance with the rule.

* * * * *